(12) United States Patent
Saville et al.

(10) Patent No.: US 7,789,402 B2
(45) Date of Patent: Sep. 7, 2010

(54) STROLLER WITH SEAT HEIGHT ADJUSTMENT

(75) Inventors: Derek Saville, Stockton, CA (US); Daniel Newhard, Lititz, PA (US); Nico Michler, Baden-Württemberg (DE); Christian Busse, Bavaria (DE); Bianca Fleischer, Santa Monica, CA (US)

(73) Assignee: Graco Children's Products Inc., Exton, PA (US)

( * ) Notice: Subject to any disclaimer, the term of this patent is extended or adjusted under 35 U.S.C. 154(b) by 513 days.

(21) Appl. No.: 11/756,702

(22) Filed: Jun. 1, 2007

(65) Prior Publication Data

US 2008/0296872 A1    Dec. 4, 2008

(51) Int. Cl.
*B62B 9/12* (2006.01)
(52) U.S. Cl. ............... 280/47.38; 280/642; 280/6.15
(58) Field of Classification Search .......... 280/642, 280/643, 647, 648, 650, 657, 658, 47.38, 280/6.15, 79.2; 297/311, 344.1, 344.12, 297/344.16, 344.18, 344.19
See application file for complete search history.

(56) References Cited

U.S. PATENT DOCUMENTS

| | | | |
|---|---|---|---|
| 5,301,970 A | | 4/1994 | Haskins |
| 5,526,908 A | * | 6/1996 | Wang .................... 190/115 |
| 5,601,302 A | | 2/1997 | Beard et al. |
| 5,709,400 A | | 1/1998 | Bonnier et al. |
| 5,845,924 A | | 12/1998 | Huang |
| 5,862,572 A | * | 1/1999 | Lin et al. .................. 16/405 |
| 6,047,798 A | * | 4/2000 | Lin .......................... 190/18 A |
| 6,061,871 A | * | 5/2000 | Wang ....................... 16/113.1 |
| 6,079,527 A | * | 6/2000 | Kuo .......................... 190/115 |
| 6,099,022 A | | 8/2000 | Pring |
| 6,193,263 B1 | | 2/2001 | Lin |
| 6,203,054 B1 | | 3/2001 | Matsumoto |
| 6,209,892 B1 | | 4/2001 | Schaaf et al. |
| 6,247,203 B1 | * | 6/2001 | Kuo ......................... 16/113.1 |

(Continued)

FOREIGN PATENT DOCUMENTS

DE    2 648 102    12/1990

(Continued)

OTHER PUBLICATIONS

Britax Preview Lightweight Umbrella Travel System (Jun. 2004).

(Continued)

*Primary Examiner*—Lesley Morris
*Assistant Examiner*—Brodie Follman
(74) *Attorney, Agent, or Firm*—Lempia Braidwood LLC (57) ABSTRACT

A stroller includes a base frame assembly and a seat assembly supported by the base frame assembly. A seat leg extending from the seat assembly is slidably engaged with the base frame assembly for movement of the seat assembly relative to the base frame assembly from a first seating height level to a second seating height level. In some cases, a support post of the base frame assembly is oriented in a telescopic arrangement with the seat leg along a generally vertical axis. In some cases, one or more slider mechanisms slidably couple the seat assembly to the base frame assembly, where each slider mechanism has a lock to secure the seat assembly at either the first seating height level or the second seating height level.

33 Claims, 7 Drawing Sheets

U.S. PATENT DOCUMENTS

| | | |
|---|---|---|
| 6,398,233 B1 | 6/2002 | Liang et al. |
| 6,446,990 B1 | 9/2002 | Nania et al. |
| 6,540,250 B1 | 4/2003 | Peterson |
| 6,585,215 B2 * | 7/2003 | Duncan ................... 248/407 |
| 6,715,783 B1 | 4/2004 | Hanson et al. |
| 7,021,650 B2 * | 4/2006 | Chen ...................... 280/642 |
| 7,032,922 B1 * | 4/2006 | Lan ........................ 280/648 |
| 7,261,328 B2 * | 8/2007 | Minix ...................... 292/28 |
| 7,549,661 B2 * | 6/2009 | Jackson et al. ............ 280/204 |
| 7,673,940 B2 * | 3/2010 | Fritz et al. ............. 297/256.11 |
| 2003/0001066 A1 * | 1/2003 | Chen et al. ................ 248/511 |
| 2006/1000122 | 1/2006 | Refsum |
| 2007/0045975 A1 | 3/2007 | Yang |
| 2007/0194614 A1 * | 8/2007 | Chen et al. ............. 297/344.18 |
| 2009/0033066 A1 | 2/2009 | Saville et al. |

FOREIGN PATENT DOCUMENTS

| | | |
|---|---|---|
| DE | 202006012430 | 11/2006 |
| EP | 1 992 543 | 8/2006 |
| WO | WO 96/22907 | 8/1996 |
| WO | WO 01/32493 | 5/2001 |

OTHER PUBLICATIONS

Stokke Product Guide featuring Stokke Xplory stroller, 7 pages (Fall 2006).

Great Britain Search Report issued in Great Britain Application No. 0911254.1 mailed Oct. 13, 2009.

Great Britain Search Report issued in Great Britain Application No. 0911254.1 mailed Dec. 16, 2009.

* cited by examiner

STROLLER WITH SEAT HEIGHT ADJUSTMENT

BACKGROUND OF THE INVENTION

1. Field of the Disclosure

The present disclosure is generally directed to strollers and, more particularly, to strollers having adjustable seating.

2. Description of Related Art

Strollers are usually capable of re-configuration and other adjustments after assembly. Most strollers can adapt from an in-use configuration to a folded configuration for purposes of storage, transport, etc. Folding arrangements and other adjustments have often involved adjustable connectors, brackets and other links between frame sections. Using the adjustable links, re-configuration of the stroller can be accomplished without disassembling the stroller. Other adjustments have involved reclining seat backs, removable or replaceable occupant trays, and adjustable foot rests.

Some strollers have also been capable of accommodating infant child occupants. To this end a seat assembly has been adjustable to receive an infant car seat carrier. For example, strollers have been equipped with a seat frame capable of repositioning a seat back to allow an infant car seat carrier to engage the seat frame. In these cases, the seat frame is often shaped to resemble an infant car seat base, to which the infant car seat carrier is coupled.

Unfortunately, the above-described adjustments have provided only limited amounts of stroller versatility. For example, a seat assembly may be well suited for children of a certain size, while not as well-suited for children of other sizes. Seat assemblies may also be adequately positioned for only certain uses of the stroller.

One stroller marketed as a widely compatible design is the Xplory stroller available from Stokke L.L.C. (Kennesaw, Ga.; www.stokkeusa.com). The Xplory stroller has a seat assembly that connects to a central inclined column. The connection can be re-positioned to raise or lower the seat assembly along the central, inclined column. Further details on this stroller design are set forth in U.S. Patent Publication No. 2006/0001226.

BRIEF DESCRIPTION OF THE DRAWINGS

Objects, features, and advantages of the present invention will become apparent upon review of the following description in conjunction with the drawing figures, in which.

DETAILED DESCRIPTION OF THE DISCLOSURE

The disclosure is generally directed to strollers having a height-adjustable seat or seat assembly. Adjustment of the height or level of the stroller seating generally involves a slidable interface or coupling at the interface(s) between components of the stroller frame. The height or level of the stroller seat is generally maintained by one or more locks, clamps or other fastening structures, along with a release mechanism to allow height adjustment. In some cases, the locking structure provides a discrete number of seat heights or levels for quick and convenient adjustment by a caregiver. In other cases, the seat or seat assembly may be adjusted continuously.

Seat height adjustment may provide a number of advantages and benefits. For example, a different seat height may correspond with a more comfortable and convenient seating arrangement for the occupant. In one case, the stroller can be used as a seat at a table by raising the seat assembly to a height appropriate for the table.

Unfortunately, an interface or connection between a seat assembly and a stroller frame may be undesirably accessible to the seat occupant. A seat occupant may then be tempted to release the connection, especially where only a single interface exists between the frame and the seat assembly. The release of the connection may then occur while the seat is occupied by a child.

The strollers disclosed herein are generally configured to inhibit a child occupant from adjusting the stroller frame interface or connection, while still facilitating seat height adjustment by the caregiver. More specifically, one aspect of the disclosure involves an adjustment mechanism having a two-sided or duplex nature. For instance, a child occupant may find it difficult to actuate multiple (e.g., dual or paired) adjustment mechanisms. In this way, the stroller frame interfaces and adjustment mechanisms disclosed herein provide secure and stable seating for the child occupant.

These and other features, and advantages of the present invention will become apparent upon a review of the attached drawing figures and the detailed description below.

Turning now to the drawings, an exemplary stroller is generally depicted at 100 in FIGS. 1-4 and is constructed in accordance with the teachings of the present invention. In this example, the stroller 100 generally has a frame assembly 102, a seat assembly 104 (FIG. 1) supported by the frame assembly 102, and a plurality of wheels supporting the frame assembly 102 on a ground surface. The frame assembly 102 in the disclosed example includes a pair of rear wheels 106 and a pair of front wheel assemblies indicated generally at 108. In this example, each front wheel assembly 108 has two wheels 109 spaced apart side by side. The configuration and construction of the front wheel assemblies 108 and the rear wheels 106 can vary considerably and yet fall within the spirit and scope of the present invention.

The frame assembly 102 generally has a seat mounting frame 110 configured for compatibility with a variety of seat assemblies or other seating components. To that end, some, if not all, of the seat assembly 104 may be removable from the seat frame 110 and the stroller 100. For example, a car seat carrier (not shown) may then engage the seat frame 110 to accommodate an infant child occupant. In these and other cases, the seat mounting frame 110 may be considered an integral or other component of the frame assembly 102. However, the seat mounting frame 110 may also be considered a part or portion of the seat assembly 104, such as when one or more other units of the seat assembly 104 are integrally formed with the seat mounting frame 110 or otherwise not removable from the seat mounting frame 110. More generally, the seat mounting frame 110 may alternatively be considered a component shared by both the frame assembly 102 and the seat assembly 104.

Figure 1:
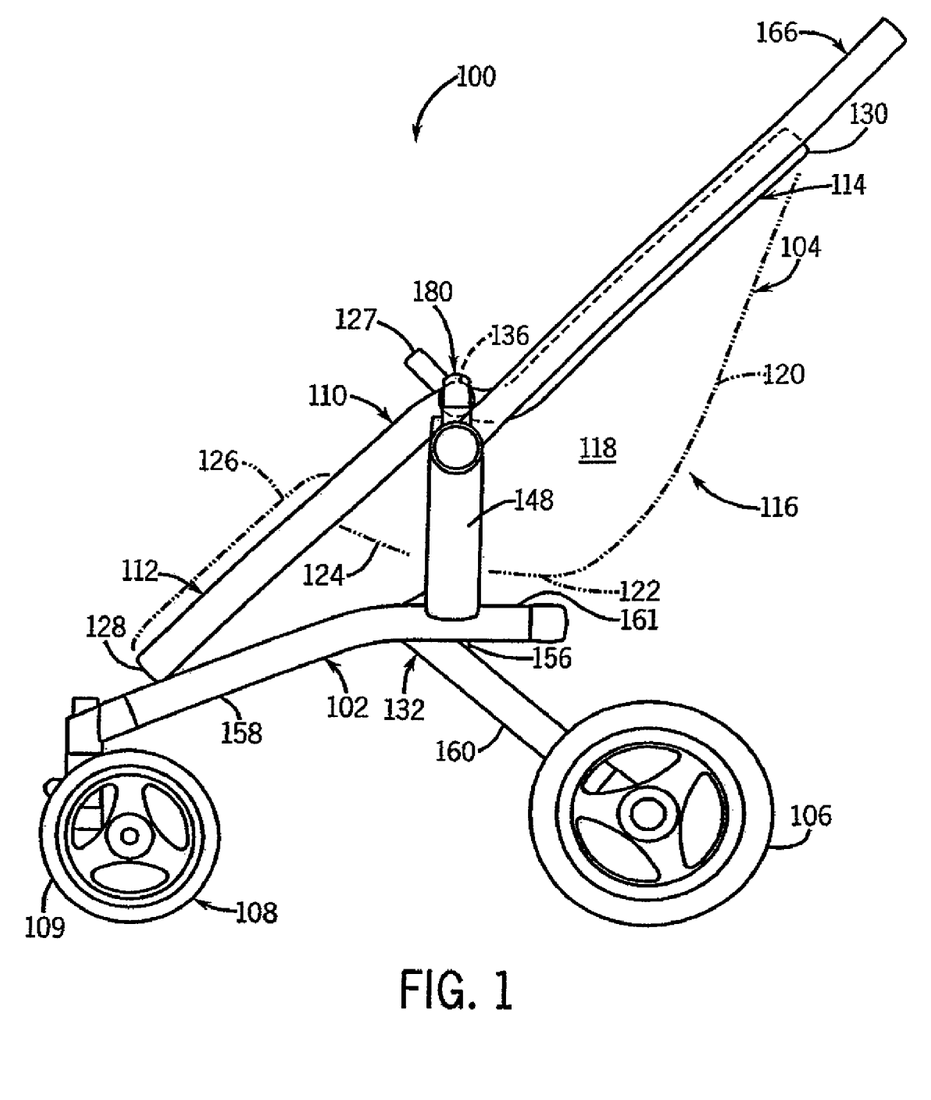
FIG. 1 is a side, elevational view of an exemplary stroller having a height-adjustable seat assembly in accordance with one embodiment.

In this exemplary case, one or more components of the seat assembly 104 are supported by a pair of U-shaped components of the seat frame 110. More specifically, the U-shaped components correspond with a lower, front seat attachment tube 112 and an upper, rear seat attachment tube 114. Both of the seat attachment tubes 112, 114 have elongate sides integrally formed with arch-shaped ends, collectively defining upper and lower U-shaped support a structures. Each seat attachment tube 112, 114, in turn, defines a respective area in which portions of the seat assembly 104 are positioned or suspended. For example, as best shown in FIG. 1, a seat indicated generally at 116 and shown in phantom may include side panels or wings 118 and a seat back or backrest 120 suspended from the seat attachment tube 114. The side panels 118 and the backrest 120 may extend downward toward, and connect with, a seat bottom 122 of the seat 116. The seat bottom 122 may also be suspended from, or supported by, the seat attachment tube 112 at a front end 124 of the seat bottom 122. The seat assembly 104 may also include a log rest portion 126 disposed within the arch defined by the seat attachment tube 112. An occupant tray bar 127 may cross the seat assembly 104 at a position above the leg rest portion 126 and forward of the backrest 120. Apart from supporting an occupant tray (not shown), the bar 127 may help retain the seat occupant in the seat 116 and be used for other purposes (e.g., an occupant arm rest, or infant carrier attachment). Optional components of the seat assembly 104 include a foot rest (not shown) connected to the seat mounting frame 110 at or near a lower end 128 of the seat attachment tube 112, as well as a canopy (not shown) connected to the seat mounting frame 110 at or near an upper end 130 of the seat attachment tube 114.

Any one or more of the above-referenced parts of the seat 116 can be made entirely of fabric or like materials and include components directed to facilitating attachment to, or suspension from, the seat frame 110. Alternatively or additionally, portions of the seat assembly 116 may include a cover material, which may be removable, and placed over a generally rigid supporting structure that defines and shapes the portion of the seat, such as the seat bottom 122 or the seat side wings 118. Thus, once attached to the seat frame 110, the seat assembly 104 can be sufficiently supported on the stroller 100 and substantial enough to support the weight of a child occupant. More generally, the configuration and construction of the seat 116 and other portions of the seat assembly 104 can vary considerably and yet fall within the spirit and scope of the present invention.

The lower and upper seat attachment tubes 112 and 114 are attached to a base portion or chassis 132 of the frame assembly 102 at a pair of rotational or pivotal seat joints 134 and 136. More specifically, side rails or arms 138 and 140 of the lower seat attachment tube 112 extend rearward and upward from the lower end 128 to terminate at the seat joints 134 and 136, respectively. Similarly, side rails or arms 142 and 144 of the upper seat attachment tube 114 extend downward and forward from the upper end 130 to terminate at the seat joints 134 and 136, respectively. In this exemplary case, the lower and upper seat attachment tubes 112 and 114 are separately coupled to the seat joints 134 and 136 to enable independent rotation of the lower and upper seat attachment tubes 112 and 114. In other cases, the lower and upper seat attachment tubes 112 and 114 may be integrally formed or otherwise fixedly attached to one another. The seat joints 134 and 136 are positioned on horizontal pivot axes M1 and M2 (FIG. 2) that extend horizontally along a transverse line disposed between the front and rear wheels 106, 109. The seat joints 134 and 136 generally allow the inclination or declination of the components of the seat assembly 104 to be adjusted relative to the base frame or chassis 132, which, in contrast, generally includes a set of structural components in fixed relation to each other. Each end of the occupant tray bar 127 may also be coupled to the frame assembly 102 at or near the seat joints 134, 136.

In the exemplary embodiment shown in FIGS. 1-4, the chassis 132 and, more generally, the frame assembly 102 includes a pair of upstanding frame posts 146 and 148 that extend upward to the seat joints 134 and 136, respectively. In this manner, the frame posts 146 and 148 couple the seat frame 110 (and, by extension, the seat assembly 104) to the remainder of the frame assembly 102 (and, by extension, the non-seating portions of the stroller 100) at a position, or level, above the chassis 132. Each post 146, 148 may have a tubular cross-section and, for example, be formed from extruded aluminum or any other material(s) providing sufficient structural support. The posts 146 and 148 are connected by a cross member or brace 150 (FIGS. 2-4) of the chassis 132 that may, but need not, be integrally formed with the posts 146, 148, as shown. The brace 150 extends horizontally on a line parallel with the pivot axes M1 and M2 and may include ends 152 and 154 that are bent upward to meet the posts 146, 148. In this exemplary case, the brace 150 and the posts 146, 148 form a U-shaped support structure extending upward from other portions of the base frame or chassis 132 to interface with the seat frame 110 and other seating components of the stroller 100.

The frame 102 further includes a bracket 156 to couple the brace 150 to a pair of front legs 158 and a pair of rear legs 160 of the chassis 132. In alternative embodiments, a clamp or other connector may be utilized to couple the brace 150 to the front and rear legs 158 and 160. The brace 150 need not be coupled to both the front and rear legs 158 and 160 via the same connection. In some cases, one or more additional brackets, clamps or other connectors (not shown) may be included to establish any number of further frame leg connections.

In this exemplary case, the front legs 158 are disposed on an incline until about midpoint between the front and rear wheels 106, 109, at which point each front leg 158 is bent to a horizontal, cantilevered end 161 of the chassis 132. Each cantilevered end 161 extends rearward from the front legs 158 beyond the bracket 156 before being capped at termination points generally above the rear legs 160, as shown in FIG. 1.

Figure 2:
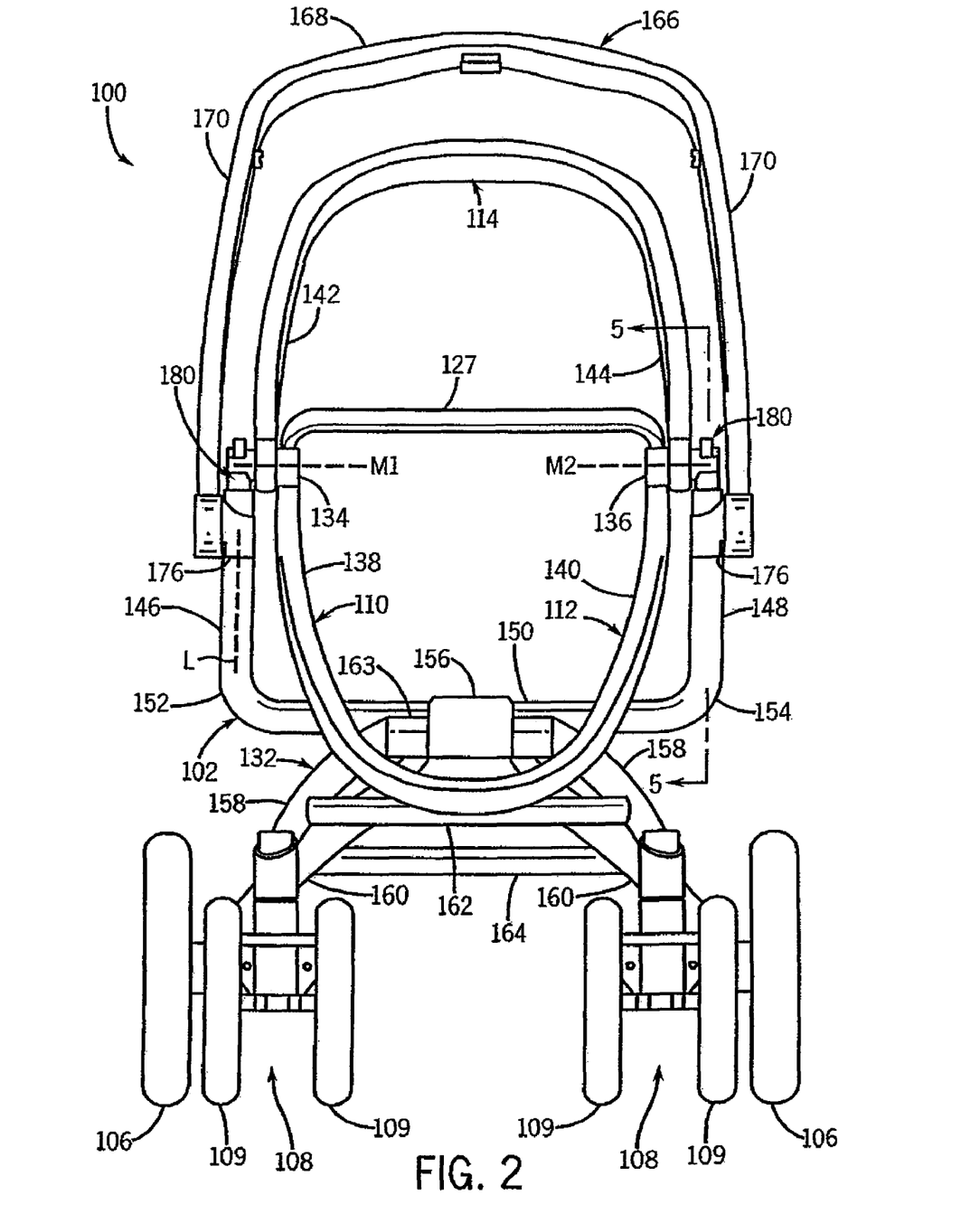
FIG. 2 is a front, elevational view of the stroller of FIG. 1.
Figure 3:
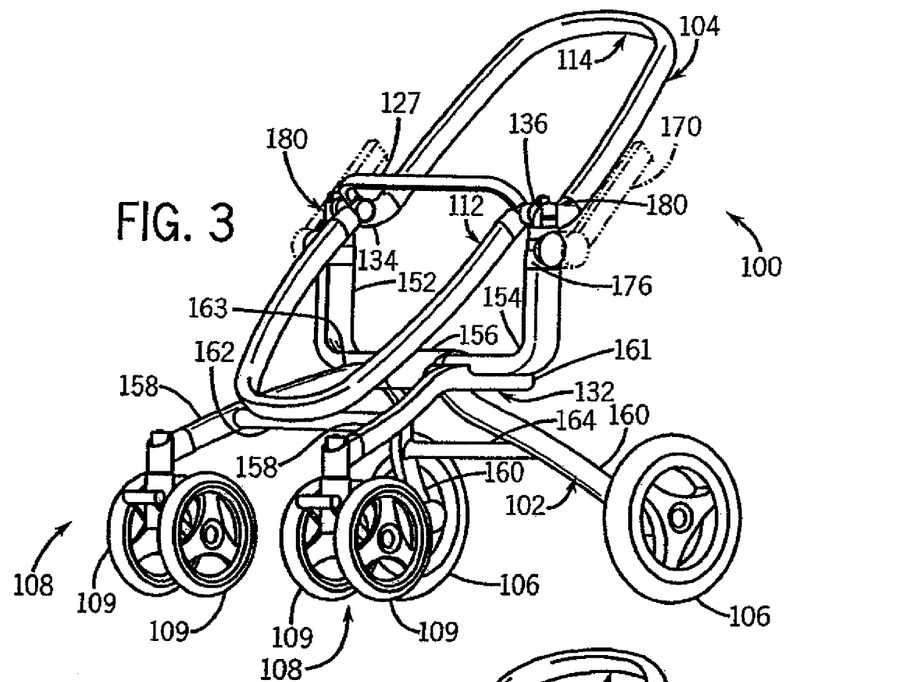
FIG. 3 is a front, perspective view of a portion of the stroller of FIG. 1 showing the seat assembly positioned at a lowered height level.
Figure 4:
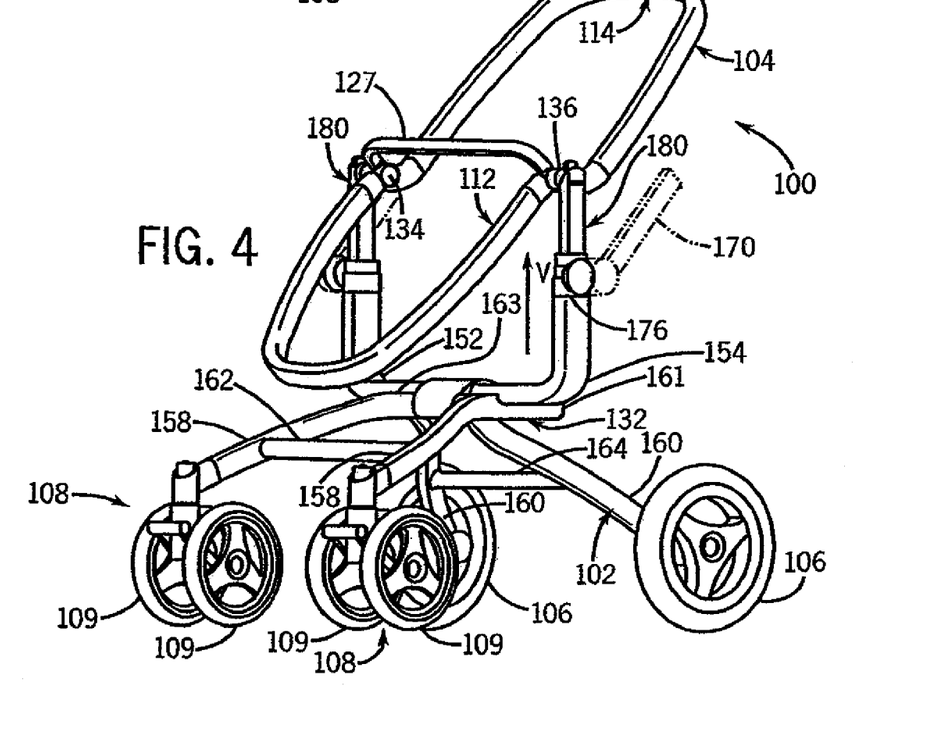
FIG. 4 is a front, perspective view of a portion of the stroller of FIG. 1 showing the seat assembly positioned at a raised height level.

The pair of front legs 158 are laterally connected by transverse front leg links 162 and 163 (FIGS. 2-4), while the pair of rear legs 160 are laterally connected by a transverse rear leg link 164 (FIGS. 2-4). The links 162-164 generally provide stability for the frame assembly 102. To this end, the leg links 162 and 164 extend horizontally between the legs connected thereby at a position approximately midway down the length of the corresponding legs. The front leg link 163 also extends horizontally between the front legs 158 at an upper end thereof. The bracket 156 engages the leg link 163 midway between the front legs 158, as best shown in FIG. 2. Each leg link 162, 163, 164 may be integrally formed with the legs connected thereby or otherwise attached in a secure manner to provide structural support. Other embodiments may alternatively or additionally include leg links disposed at different positions along the length of the legs 158, 160. One or more leg links may also be provided to connect one of the legs 158 with one of the legs 160. The chassis 132 and, more generally, the frame assembly 102, may include any number and variety of leg links and other connectors in any desired configuration to provide a stable base or foundation for the seat assembly 104.

As shown in FIGS. 1 and 2, the stroller 100 includes a handle 166 that extends in a rearward direction from the frame posts 146 and 148. More specifically, the handle 166 includes an arch-shaped end 168 to be engaged by a caregiver to push and maneuver the stroller 100. The end 168 may, but need not, be integrally formed with two side arms 170 of the handle 166 that are connected to the frame posts 146 and 148. The connections of the side arms 170 and the frame posts 146 and 148 may be disposed near a top end of each corresponding frame post 146, 148. As best shown in FIGS. 2-4, each connection may include a bracket, ring, clamp or other connector 176 to secure the handle 166 to the frame posts 146 and 148 at a desired position. In some cases, the location of the connectors 176 may be adjustable. For example, the clamp 176 may form a pressure fit around the frame posts 146 and 148 that can be released to move the clamp 176 to a new position along the frame posts 146, 148.

In accordance with one aspect of the disclosure, the height level of the seat assembly 104 is generally adjustable relative to the ground level, or equivalently, the chassis 132 or the frame assembly 102. In some cases, the height level adjustment is accomplished via directly upward or downward movement, such as along a vertical direction V (FIG. 4) or, in some cases, along an axis of the frame posts 146 and 148. That is, the upward and downward movement generally does not alter the fore-and-aft (or longitudinal) position of the seat assembly 104 relative to the base frame or chassis 132. Avoiding any such alteration may be useful, for instance, in connection with maintaining a desired weight distribution between the front and rear wheels. In that way, any height level adjustments do not result in balance or stability issues. In other cases, the height level adjustment need not involve solely vertical movement, including when, for example, the longitudinal axes of the frame posts 146 and 148 are not vertically oriented.

In the exemplary embodiments shown, the height level adjustment generally involves one or more slider mechanisms involving an interface between the seat frame 110 to the base frame or chassis 132. For example, each slider mechanism may include a seat post or support leg that couples the seat frame 110 to the base frame or chassis 132. Each seat post or support leg, in turn, is generally aligned with a longitudinal direction L of the frame posts 146, 148, as shown in FIG. 2 in connection with the frame post 146. Each seat post or support leg is generally configured to slidably engage the respective frame post 146, 148 for movement relative to the chassis 132. Such relative movement of components of the frame, in turn, moves the seat assembly 104 between multiple, in-use height levels relative to the frame assembly 102.

In the exemplary embodiment shown in FIGS. 1-4, a pair of inner post assemblies 180 extend down from the seat frame 110 and are slidably engaged within the frame posts 146, 148 and, thus, serve as the seat posts or support legs that couple the seat frame 110 to the base frame or chassis 132. As best shown in FIGS. 3 and 4, the sliding relationship of the inner post assemblies 180 and the frame posts 146 and 148 is telescopic in nature in this example. Accordingly, each inner post assembly 180 generally provides a column or other insert shaped to be cooperatively received by the frame posts 146 and 148. FIG. 4 shows the inner post assemblies 180 after upward relative movement along the vertical direction V between the frame posts 146 and 148 and the inner post assemblies 180. As described further below, the inner post assemblies 180 include a number of components to facilitate the telescopic sliding relationship as well as for locking the seat assembly 104 into position at a desired height level. While this case involves the inner post assemblies 180 fitting inside of the frame posts 146 and 148, alternative telescoping arrangements may involve a reverse relationship where the frame posts 146 and 148 are inserted within, or received by, elements of the seat assembly or seat frame.

Notwithstanding the foregoing, the height level adjustment aspect of this disclosure is not limited to telescoping columns or other telescoping arrangements. On the contrary, the *o height level of the seat assembly 104 may involve other types of sliding arrangements, including, for instance, posts, shafts or columns arranged in side-by-side and other configurations for generally vertical movement to raise or lower the seat assembly 104. Furthermore, the relative movement of the frame components need not be linear. One example of non-linear movement may involve a threaded relationship that results in helical or twisting motion.

As a general matter, a height level adjustment involves disengaging a lock mechanism securing the seat assembly 104 in position, followed by moving the inner post assemblies 180 to a new position relative to the frame posts 146 and 148. The lock mechanism may then be re-engaged to maintain the new height level. In the exemplary case shown in FIGS. 1-4, movement of the seat assembly 104 results in an upward or downward displacement of the seat joints 134 and 136 (and pivot axes M1 and M2). Such displacement then results in corresponding changes in the height level of the seat bottom 122 and, more generally, the seat 118.

An exemplary slider mechanism 178 is shown in greater detail in FIGS. 5-8. In this case, the inner post assemblies 180 interact with the frame posts 146, 148 in accordance with a telescoping arrangement. The arrangement is structured to provide a discrete number (e.g., three) of height level options for the seat assembly 104 with a pin-based lock-and-release mechanism. Generally speaking, the pin-based lock-and-release mechanism involves a number of pins (i.e., one or more) engaging a corresponding set of slots at each height level option. The number of slot sets can vary considerably from the embodiment shown in FIGS. 5-8 and yet still fall within the scope of the invention. Consequently, alternative arrangements may present any desired number of height level options. Alternatively, other embodiments may support continuous (rather than discrete) height level adjustment for an infinite number of height level options.

Figure 5:
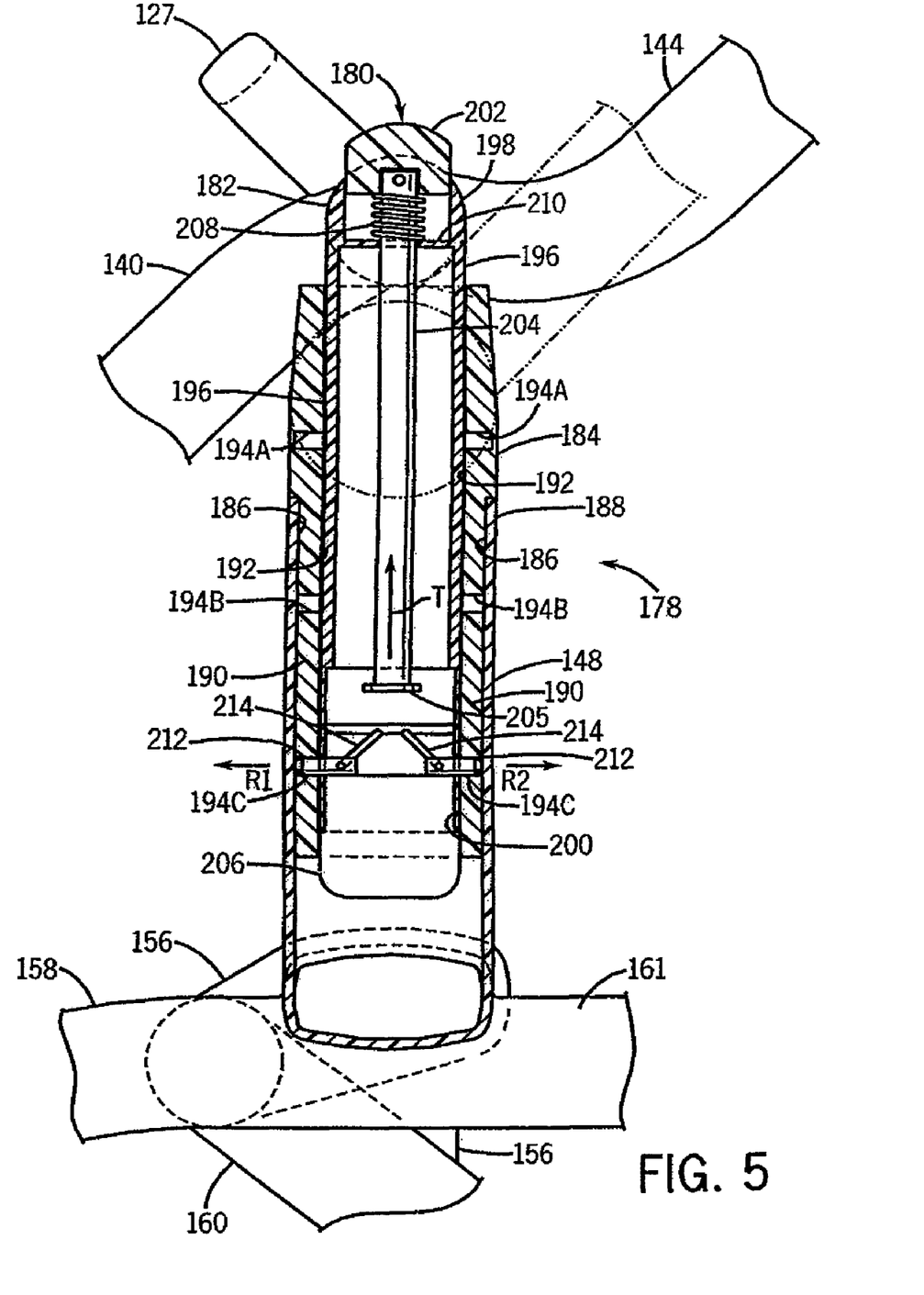
FIG. 5 is a sectional view of a sliding height adjustment assembly taken along lines 5-5 of FIG. 2.

Turning to FIG. 5, the exemplary inner post assembly 180 is shown partially disposed within the frame post 148 in a telescoping relationship. The inner post assembly 180 includes an upper end 182 protruding upward from a cap 184 that acts on an outer guide for alignment of the telescoping relationship. The cap 184 and the frame post 148 define a vertical shaft or other conduit in which the inner post assembly 180 is received. To that end, the cap 184 engages an inner surface 186 of the frame post 148 from a top end 188 of the frame post 148 downward to the extent that an insert portion 190 of the cap 184 is disposed within the frame post 148. The insert portion 190 of the cap 184 may be secured to the inner surface 186 in any desired fashion, including via an adhesive or pressure fit. Alternatively, the cap 184 and the inner surface 186 may be in threaded engagement.

To provide different seat height options, a number of slot pairs are formed at a corresponding number of height levels along an interior surface 192 of the cap or outer guide 184.

Each slot pair is generally configured to receive a pair of pins to secure the inner post assembly 180 at one of the available height levels. In this exemplary case, a first pair of slots 194A correspond with an upper height level, a second pair of slots 194B correspond with a middle height level, and a third pair of slots 1 94C correspond with a lower height level. In each case, the slot pairs include one slot disposed on a forward or front side of the cap 184, and another slot disposed on a rearward or back side of the cap 184. However, the positioning, shaping, depth, number and other characteristics of the slots (or other detents or depressions) may vary considerably for cooperation with a variety of pins (or other projections), further details of which are provided below. For instance, each height level need not involve diametrically opposed pairs of slots as described above and shown in FIG. 5.

The inner post assembly 180 includes a stanchion or pillar 196 in telescopic sliding relationship with the interior surface 192 of the cap or outer guide 184. The stanchion 196 acts as a guide that cooperates with the cap 184 to allow and direct the slidable interface. The stanchion 196 may be shaped as a columnar shell or enclosure, the outer surface of which provides the guiding function, with the inner surface defining an interior cylinder, or internal chamber, that houses further components of the inner post assembly 180. In this case, the stanchion 196 has a closed, upper end 198 that protrudes upward and outward beyond the cap 184. An open, lower end 200 of the stanchion 196 is disposed within the frame post 148. The positioning of these ends 198, 200 relative to the frame post 148 (and, more generally, other portions of the frame assembly 102 and chassis 132) can change dramatically during a seating height adjustment.

The lock-and-release components of the inner post assembly 180 are now described. Beginning near the top of the inner post assembly 180, a release button 202 extends upward from the upper end 198 of each stanchion 196. The release button 202 is in communication with a central tube or shaft 204 disposed in the chamber of the assembly 180. The release button 202 and the central tube 204 are coupled via, for instance, a pin or other connector. Alternatively, the button 202 may be formed integrally with the central tube 204. The central tube 204 generally extends through much of the length of the internal chamber defined by the stanchion 196 until a lower end 205 of the tube 204 is captured by, or otherwise in communication with, a plug 206 of the assembly I 80. In the position shown in FIG. 5, the plug 206 is biased upward along a longitudinal axis T of the center tube 204 by a spring 208 acting on a platform 210 near the upper end 198 of each stanchion 196. Such biasing of the center tube 204, in turn, raises the plug 206 such that a pair of pins 212 are biased outwardly in radial directions R1 and R2, as shown in FIG. 5. The pins 212 are biased outwardly because the longitudinal position of the plug 206 is forcing the pins 212 toward the bottom of respective tracks 214 formed within the plug 206. More specifically, each track 214 is sloped (e.g., inclined or declined with respect to the longitudinal axis T) to translate the longitudinal position of the plug 206 into a radial or transverse position of the corresponding pin 212. To this end, a projection coupled to each pin 212 rides within respective tracks 214 formed within the plug 206, as shown in FIG. 8.

Figure 6:
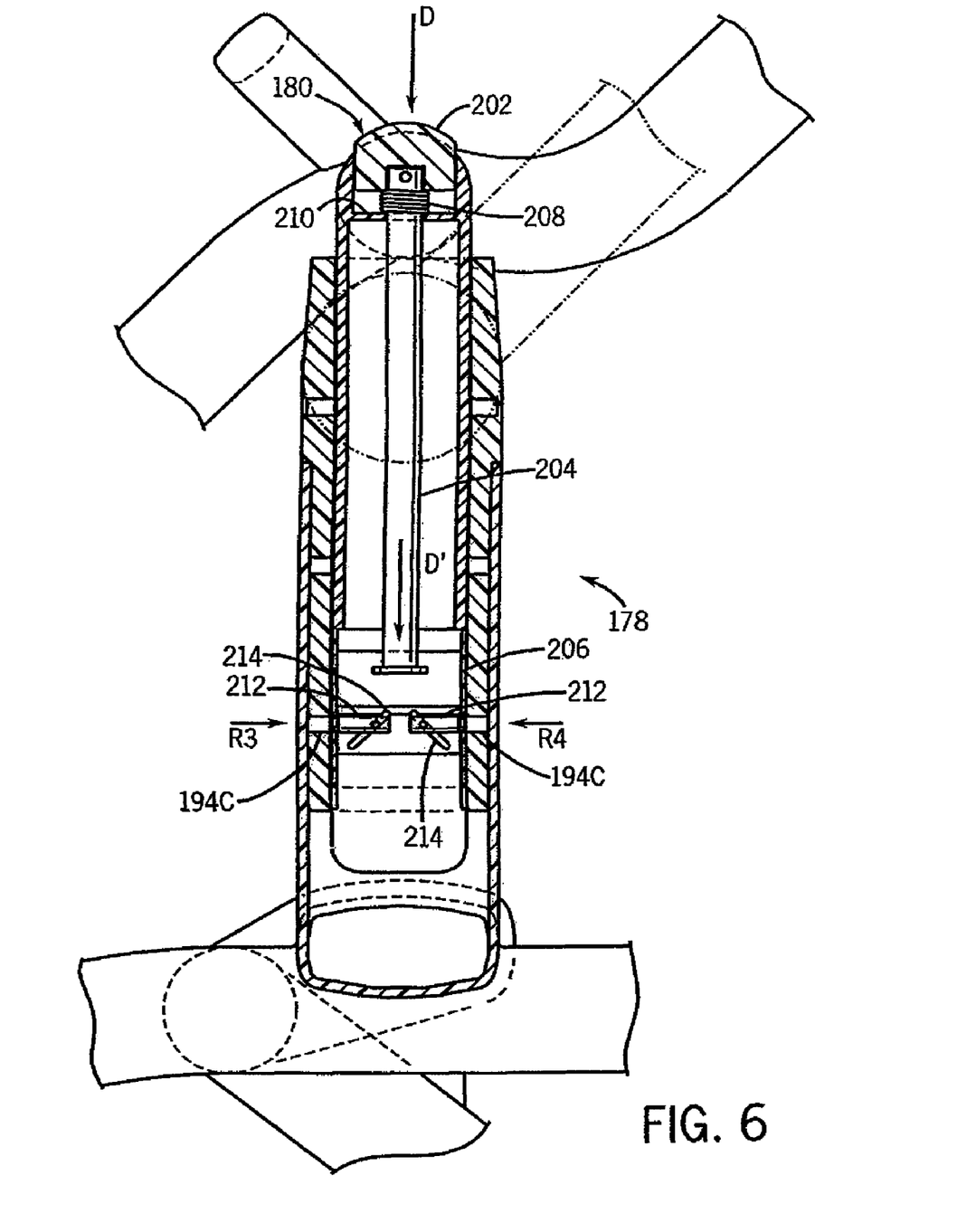
FIG. 6 is a sectional view of the sliding seat height adjustment assembly of FIG. 5 upon actuation of a release mechanism for adjustment of the height level of the seat assembly.

FIG. 6 shows the actuation of the button 202 with an applied force D to release the inner post assembly 180 from a locked position at the lowest height level (i.e., the slot pair 194C). The platform 210 maybe configured and shaped to allow the central tube 204 to pass through and be displaced downward when the spring 208 is compressed via the force D. Driving the central tube 204 downward in the direction of the applied force D, in turn, applies a downward force D' on the plug 206, displacing the plug 206 downward relative to the pins 212, which remain partially located in the sots 194C at least initially. However, as the tracks 214 of the plug 206 are displaced downward, the tracks 214 apply radially inward forces R3 and R4 as the pins 212 follow the tracks 214. Eventually, the pins 212 are fully retracted from the slots 1194C. The plug 206 and other components of the inner post assembly 180 may be configured so that such full retraction of the pins 212 occurs upon a substantially complete depression of the release button 202. Furthermore, the spring constant of the bias spring 208 may be selected such that a child occupant would not be capable of, or at least have great difficultly in, completely or sufficiently depressing the release button 202. Moreover, actuation of only one of the buttons 202 will not result in a height level adjustment, insofar as the other inner post assembly 180 will remain locked in position. In these ways, the two-sided or duplex nature of the seat height level adjustment further promotes a child-proof lock-and-release mechanism. In this specific case, the duplex adjustment is provided by twin or paired telescoping arrangements on either side of the seating, but other arrangements or locations involving multiple interfaces may alternatively be utilized.

Figure 7:
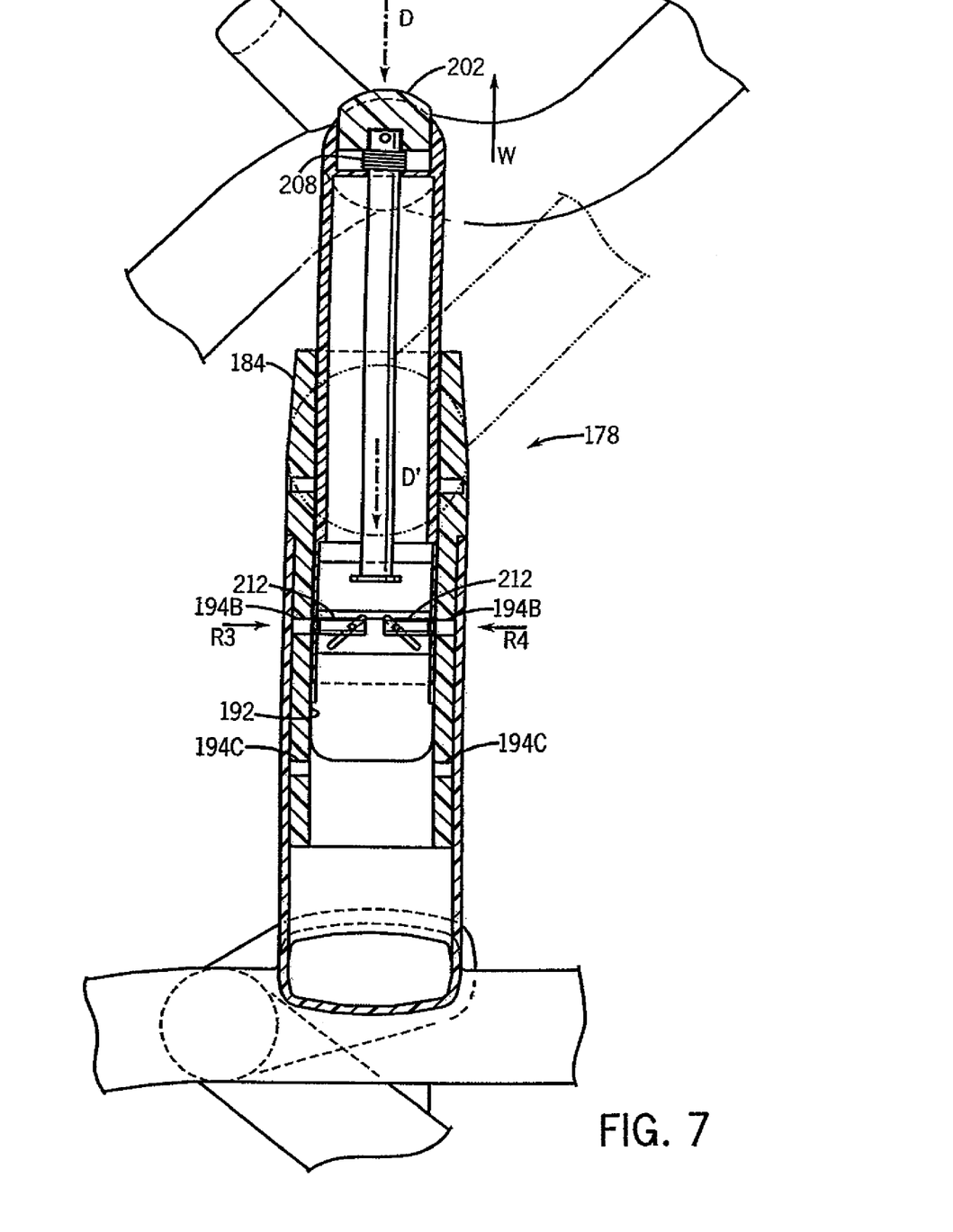
FIG. 7 is a sectional view of the sliding height adjustment assembly of FIGS. 5 and 6 after adjustment of the seat assembly to a higher level but before being locked into position.

Turning now to FIG. 7, the height level of the seating can be adjusted with the disengagement of the pins 212 from the slots 194A-C. With the pins 212 in a retracted position, an upward force W applied to a portion of the seat mounting frame 110 (or any portion of the seat assembly 104) can slide the inner post assembly 180 upward to raise the seating as shown. In this example, the inner post assembly 180 has been raised from the lowest slots 194C to the level of the middle slots 194B. During the movement between the two height levels, the downward force D applied to the release button 202 may be maintained, keeping the pins retracted as shown. Alternatively, the force D may be discontinued once the pins 212 are no longer aligned with the slots 194C. In between the two levels, the pins 212 will not be able to fire outward completely, as the inner surface 192 of the cap 184 blocks the outward displacement despite the bias force of the spring 208. Once the level of the slots 1944B is reached, however, the spring 208 will be allowed to decompress as the pins 212 fire outward to engage the slots 194B.

Figure 8:
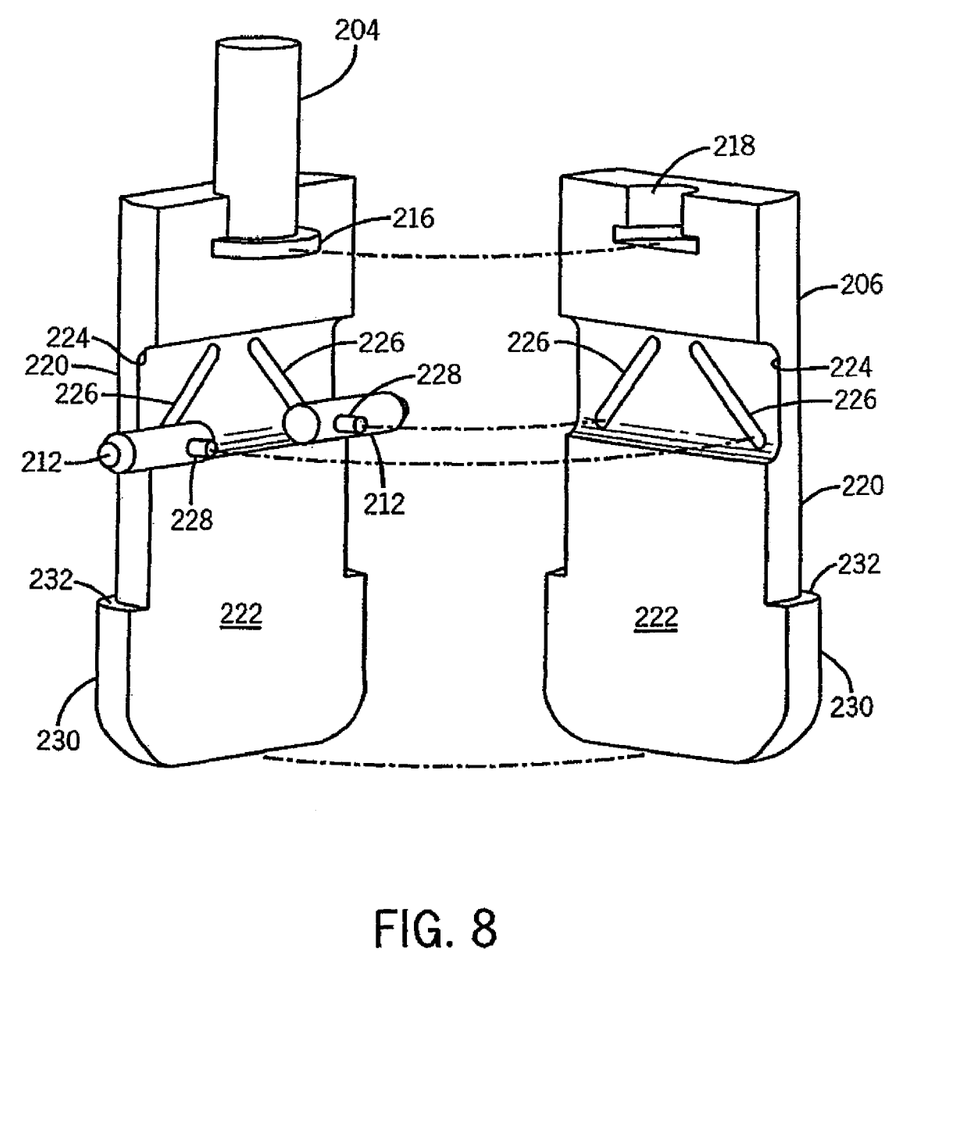
FIG. 8 is a partial, exploded view of the lock-and-release components of the sliding seat height adjustment assembly of FIGS. 5 and 6.

FIG. 8 shows the plug 206 and its engagement with the central post 204 in greater detail. In this exemplary case, an enlarged end 216 of the central tube 204 is received within complementary depressions 218 formed within mirrored halves or parts 220 of the plug 206. To secure the central tube 204 in position and form the plug 206, the mirrored parts 220 are joined at respective faces 222. Each face 222 includes a recessed portion 224 to form an interior chamber in which the pins 212 travel. Indents 226 for the sloped tracks 214 are formed in each recessed portion 224 and shaped to receive projections 228 extending transversely from each pin 212. In operation, the projections 228 are guided by the indents 226 to travel along the tracks 214 as the plug 206 is displaced.

A lower end 230 of each mirrored part 220 of the plug 206 has a radially extending shelf that forms an enlarged end cap 232 when the mirrored parts 220 are joined. The enlarged end cap 232 limits the insertion of the plug 206 within the sleeve formed by the inner post assembly 180.

The components of the inner post assembly 180 may be composed of a variety of materials, including, for instance, strong, durable plastics, metal, or the like. Generally speaking, materials may be selected for certain components of the inner post assembly 180 in accordance with the degree to which the component provides structural support.

Although described above in connection with a pin-based lock-and-release mechanism, practice of the seating height level adjustment invention described herein may utilize or involve components other than pins to secure the seating in position at a desired height level. For example, alternative locking mechanisms may utilize bolts, brackets, clamps and other fasteners that may be released or otherwise adjusted to permit height level adjustment. Such alternatives may be useful in situations where a continuum of seating height levels is desirable. Other embodiments may involve one or more rods or bolts that engage holes formed in frame tubing. In these and other cases, the frame tubing and other components in sliding relationship during the height level adjustment need not be telescoping, but rather may be disposed in a variety of alternative configurations or arrangements.

Of those embodiments utilizing pins, the positioning, arrangement and control of the pins and other components of the adjustment mechanism may vary considerably from the exemplary embodiment described above. For instance, a release button need not be positioned near a top end of an adjustment post but rather may be disposed at a lower or more rearward position. In some cases, one or more release buttons may be disposed on side or bottom faces or portions of the frame posts. For example, a release button disposed underneath the frame interface may be suitably out of reach of the child occupant, in which case only a single release mechanism may be acceptable. In these and other embodiments, the release button(s) may correspond with ends of locking pins that extend radially through holes in the frame components. Such locking pins may be spring-biased outwardly through the holes. More generally, relocating the release button away from the seat occupant may be useful in situations in which a seat occupant can possibly overcome a bias force, such as a bias spring, such as when a lower bias force is desired.

Although certain strollers have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller comprising:
   a base frame assembly having an upstanding support post oriented along a generally vertical axis;
   a seat assembly supported by the base frame assembly at a fore-and-aft position relative to the base frame assembly; and
   a seat leg extending from the seat assembly in a direction aligned with the generally vertically axis in a telescopic arrangement with the upstanding support post, and slidably engaged with the support post for movement of the seat assembly relative to the base frame assembly from a first seating height level to a second seating height level without altering the fore-and-aft position of the seat assembly;
   wherein the seat leg includes a post assembly disposed within the upstanding support post and configured to lock the seat assembly at the first or second seating height level, the post assembly having an upper end protruding upward from the support post and including a release button at the upper end to release the seat assembly from the first or second seating height level.

2. The stroller of claim 1, further comprising a lock to engage the base frame assembly and the seat assembly to secure the seat assembly in position at either the first seating height level or the second seating height level.

3. The stroller of claim 2, wherein the lock comprises a spring-biased pin to be received in slots formed in the support post for the first and second seating height levels.

4. The stroller of claim 1, wherein the post assembly is telescopically received in the support post.

5. The stroller of claim 4, wherein the post assembly comprises a set of locking pins and a release button in communication with the set of locking pins.

6. The stroller of claim 1, wherein the support post is one of a pair of support posts of the base frame assembly, and wherein the seat leg is one of a pair of seat legs, each seat leg being slidably engaged with a respective support post of the pair of support posts.

7. The stroller of claim 6, further comprising a pair of locks, each lock engaging a respective support post of the pair of support posts and a respective seat leg of the pair of seat legs to secure the seat assembly in position at either the first seating height level or the second seating height level.

8. The stroller of claim 6, wherein the pair of support posts are disposed on opposite sides of the seat assembly.

9. A stroller comprising:
   a chassis;
   a seat assembly supported by the chassis; and
   a pair of slider mechanisms to slidably couple the seat assembly to the chassis for movement of the seat assembly between a first seating height level and a second seating height level, each slider mechanism moving along a respective, generally vertical axis;
   wherein each slider mechanism comprises a respective lock to secure the seat assembly at either the first seating height level or the second seating height level and a respective release button in communication with a corresponding one of the locks and movable along the corresponding, generally vertical axis to release the seat assembly from the first or second seating height level; and
   wherein each slider mechanism includes a stanchion having an upper end at which the respective release button is disposed.

10. The stroller of claim 9, wherein the chassis comprises a pair of upstanding support posts, each support post being engaged by a respective slider mechanism of the pair of slider mechanisms.

11. The stroller of claim 10, wherein the seat assembly is supported between the pair of support posts.

12. The stroller of claim 10, further comprising a pair of seat legs extending from the seat assembly, each seat leg engaging a respective support post of the pair of support posts via the lock of a respective slider mechanism of the pair of slider mechanisms.

13. The stroller of claim 12, wherein each upstanding support post is oriented along a corresponding one of the generally vertical axes, and wherein each seat leg is oriented in a direction aligned with one of the generally vertical axes.

14. The stroller of claim 12, wherein each upstanding support post is aligned with a respective seat leg in a telescopic arrangement.

15. The stroller of claim 10, wherein each lock comprises a spring-biased pin to be received in slots formed in the respective support post for the first and second seating height levels.

16. The stroller of claim 15, wherein each lock further comprises a plug to carry the spring-biased pin within the respective support post.

17. A stroller with multiple seat occupant height levels, the stroller comprising:
    a chassis having a support post;
    a seat assembly supported by the support post;
    a stanchion of the seat assembly telescopically received within the support post for movement of the seat assembly relative to the chassis between a first seating height level and a second seating height level; and a lock-and-release assembly carried by the stanchion, the lock-and-release assembly comprising a pin to engage the support post to secure the seat assembly in either the first seat height level or the second seat height level, a release button in communication with the pin to disengage the pin from the support post and allow movement between the first seat height level and the second seat height level, and a pin guide driven by the release button within the stanchion to disengage the pin.

18. The stroller of claim 17, wherein the lock-and-release assembly comprises a tube disposed within the stanchion to couple the release button and the pin guide.

19. The stroller of claim 17, wherein the pin guide comprises a plug disposed within the stanchion driven via actuation of the release button.

20. The stroller of claim 19, wherein the plug comprises an interior chamber into which the pin is retracted via the actuation of the release button.

21. The stroller of claim 17, wherein the pin guide includes a sloped track in which the pin rides to translate movement of the pin guide and modify a transverse position of the pin.

22. The stroller of claim 17, wherein the stanchion has an upper end protruding upward from the support post, and wherein the release button is disposed at the upper end.

23. The stroller of claim 17, wherein the movement between the first seat height level and the second seat height level is along a generally vertical axis, and wherein the release button is movable along the generally vertical axis to release the seat assembly from the first or second seat height level.

24. The stroller of claim 1, wherein the movement of the seat assembly is along a generally vertical axis, and wherein the release button is movable along the generally vertical axis to release the seat assembly from the first or second seating height level.

25. The stroller of claim 1, wherein the post assembly includes a stanchion and a pin guide driven by the release button within the stanchion to disengage the pin.

26. The stroller of claim 9, wherein the chassis includes a pair of upstanding support posts, wherein the stanchion of each slider mechanism is telescopically received within a respective one of the upstanding support posts, and wherein the upper end of each stanchion protrudes upward from the support post.

27. The stroller of claim 9, wherein the chassis includes a pair of upstanding support posts, wherein each slider mechanism includes a stanchion telescopically received within a respective one of the upstanding support posts, wherein each stanchion has an upper end protruding upward from the support post, and wherein each slider mechanism includes a pin guide driven by the release button within the stanchion to disengage the lock.

28. A stroller with multiple seat occupant height levels, the stroller comprising:

a chassis having a support post;

a seat assembly supported by the support post;

a stanchion of the seat assembly telescopically received within the support post for movement of the seat assembly relative to the chassis between a first seating height level and a second seating height level; and a lock-and-release assembly carried by the stanchion, the lock-and-release assembly comprising a pin to engage the support post to secure the seat assembly in either the first seat height level or the second seat height level, a release button in communication with the pin to disengage the pin from the support post and allow movement between the first seat height level and the second seat height level, a tube disposed within the stanchion and coupled to the release button, and a plug disposed within the stanchion and coupled to the tube to be driven via actuation of the release button.

29. The stroller of claim 28, wherein the plug comprises an interior chamber into which the pin is retracted via the actuation of the release button.

30. A stroller comprising:

a chassis comprising a pair of upstanding support posts;

a seat assembly supported by the chassis;

a pair of seat legs extending from the seat assembly; and a pair of slider mechanisms to slidably couple the seat assembly to the chassis for movement of the seat assembly between a first seating height level and a second seating height level, each slider mechanism moving along a respective, generally vertical axis, and each support post being engaged by a respective slider mechanism of the pair of slider mechanisms;

wherein each slider mechanism comprises a respective lock to secure the seat assembly at either the first seating height level or the second seating height level and a respective release button in communication with a corresponding one of the locks and movable along the corresponding, generally vertical axis to release the seat assembly from the first or second seating height level; and wherein each seat leg engages a respective support post of the pair of support posts via the lock of a respective slider mechanism of the pair of slider mechanisms.

31. The stroller of claim 30, wherein each upstanding support post is oriented along a corresponding one of the generally vertical axes, and wherein each seat leg is oriented in a direction aligned with one of the generally vertical axes.

32. The stroller of claim 30, wherein each upstanding support post is aligned with a respective seat leg in a telescopic arrangement.

33. A stroller comprising:

a chassis including a pair of upstanding support posts;

a seat assembly supported by the chassis; and a pair of slider mechanisms to slidably couple the seat assembly to the chassis for movement of the seat assembly between a first seating height level and a second seating height level, each slider mechanism moving along a respective, generally vertical axis, and each slider mechanism including a stanchion telescopically received within a respective one of the upstanding support posts;

wherein each slider mechanism comprises a respective lock to secure the seat assembly at either the first seating height level or the second seating height level and a respective release button in communication with a corresponding one of the locks and movable along the corresponding, generally vertical axis to release the seat assembly from the first or second seating height level;

wherein each stanchion has an upper end protruding upward from the support post, and wherein each slider mechanism includes a pin guide driven by the release button within the stanchion to disengage the lock.

* * * * *

UNITED STATES PATENT AND TRADEMARK OFFICE
CERTIFICATE OF CORRECTION

PATENT NO. : 7,789,402 B2
APPLICATION NO. : 11/756702
DATED : September 7, 2010
INVENTOR(S) : Saville et al.

It is certified that error appears in the above-identified patent and that said Letters Patent is hereby corrected as shown below:

On the title page, item [56]:
    In the References Cited – U.S. Patent Documents
    Page 2, please delete "2006/1000122" and replace with -- 2006/0001226 --

Signed and Sealed this

Twenty-sixth Day of October, 2010

David J. Kappos
*Director of the United States Patent and Trademark Office*